United States Patent
Finkleman et al.

[11] 3,902,136
[45] Aug. 26, 1975

[54] ROTATING BLADEROW AERODYNAMIC WINDOW FOR HIGH POWER PULSED GASEOUS LASERS

[75] Inventors: David Finkleman, Silver Spring, Md.; Robert F. Weber, Albuquerque, N. Mex.

[73] Assignee: The United States of America as represented by the Secretary of the Air Force, Washington, D.C.

[22] Filed: May 30, 1974

[21] Appl. No.: 474,559

[52] U.S. Cl. ............. 331/94.5 G; 350/319; 330/4.3
[51] Int. Cl.² ...................... H01S 3/22; G02B 5/00
[58] Field of Search................... 331/94.5; 350/319; 330/4.3

[56] References Cited
UNITED STATES PATENTS
2,878,716   3/1959   Leonard.......................... 350/319 X
3,654,569   4/1972   Hausmann...................... 350/319 X

*Primary Examiner*—Robert J. Webster
*Attorney, Agent, or Firm*—Joseph E. Rusz; Jacob N. Erlich

[57] ABSTRACT

An aerodynamic window for high power gaseous lasers having a plurality of blades mounted on the periphery of a circular disc outside the aperture in the laser cavity. The downwash of the blades as they move before said aperture provide a component directed into the cavity and away from the aperture to inhibit escape of the lasing medium.

7 Claims, 7 Drawing Figures

ROTATING BLADEROW AERODYNAMIC WINDOW FOR HIGH POWER PULSED GASEOUS LASERS

BACKGROUND OF THE INVENTION

This invention relates generally to lasers, and, more particularly, to an aerodynamic window for high power pulsed gaseous lasers.

It has been suggested to use lasers for a wide diversity of activities ranging from communication over great distances to the drilling of very accurate holes in objects. Many such uses require a very large amount of focused electromagnetic energy, especially where it is desired to damage or destroy an object at a distance by focusing a large amount of energy on a small area.

Lasers are now established in the art for generating coherent electromagnetic radiation in the optical frequency range. The operation of a laser is based upon the fact that the atomic systems represented by the atoms of the laser material can exist in any of a series of discrete energy level or states, the systems absorbing energy in the optical frequency range in going to a higher state and emitting it when going to a lower state.

The operation of raising the energy level of the lasing medium to produce the desired photon emission is referred to in the art as "pumping" and when more atoms reach an excited metastable state than remain in a lower energy level, a "population inversion" is said to exist.

The active medium within the laser is made optically resonant by placing reflectors at either end thereof. The reflector on at least one end of the material is made partially transmissive so that there will be an escape from the resonant chamber.

It is recognized that in many high powered gaseous lasers the material windows or reflectors which are used to isolate the medium within the laser will also disintegrate under the power of the laser. Heretofore, an effective substitute for such windows have been lacking in the art.

SUMMARY OF THE INVENTION

The instant invention sets forth a laser window which is capable of isolating the laser cavity aerodynamically. This is accomplished by utilizing the downwash from suitably contoured blades passing an open port and in so doing will inhibit efflux of the high pressure medium into surrroundings at a lower pressure. Both subsonic and supersonic operation is possible.

In this invention the blades are mounted on the periphery of a rotating disc which sweeps past the laser aperture periodically. The blade chord, incidence, and bladewall separation allowable depend upon the disc material and the operating parameters of the specific laser system of interest.

It is therefore an object of this invention to provide an airfoil downwash to counteract efflux through an open port in a laser system.

It is another object of this invention to provide an aerodynamic window to counteract efflux through an open port in a laser system in both subsonic and supersonic operation.

It is a further object of this invention to provide an aerodynamic window for a laser system which is economical to produce, highly reliable in operation and which utilizes conventional, currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DETAILED DESCRIPTION OF THE PREFERRED EMBODIMENTS

Figure 1:
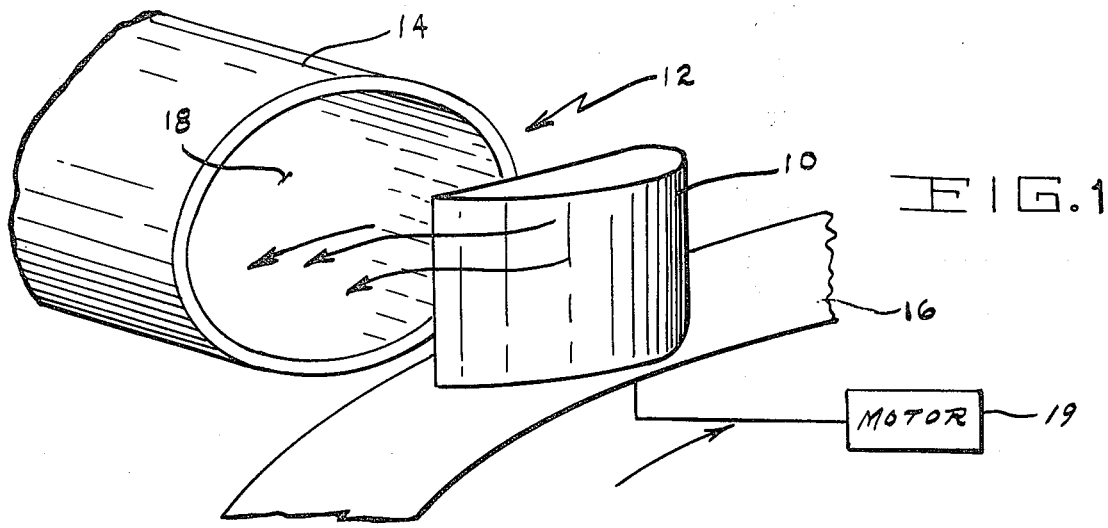
FIG. 1 represents a pictorial view of a blade of the aerodynamic window of this invention shown before a gaseous laser opening with the driving motor shown in schematic fashion.

Reference is now made to FIG. 1 of the drawing which best shows the rotating blade 10 of the aerodynamic window 12 of this invention for use with a high power pulsed gaseous laser 14. Blade 10 is one of a plurality of blades (not shown in FIG. 1) fixedly or adjustably secured to a rotating disc 16 which is mounted adjacent to the aperture 18 of gaseous laser 14. Any suitable drive means such as an electric motor 19 is operably connected in any conventional manner to disc 16 so as to cause the rotation of blades 10 before aperture 18 at a predetermined speed. The blades 10 are of a configuration described hereinbelow and mounted in such a manner so that the efflux of the high pressure medium within laser 14 will be prevented from passing on to the surroundings at low pressure.

Figure 2:
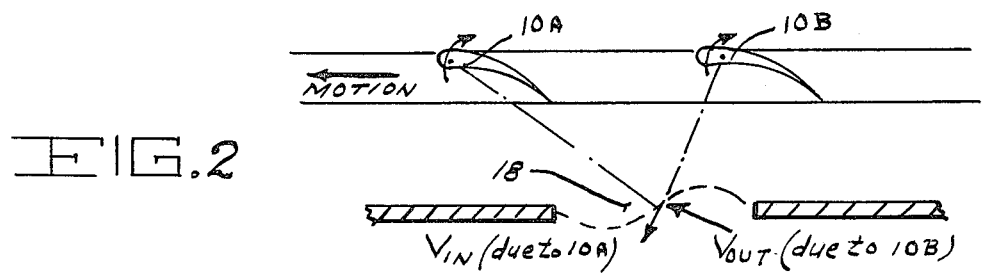
FIG. 2 is a schematic illustration of the bladerow aerodynamic window of this invention in a subsonic operation.

As shown in FIG. 2 of the drawing the adverse upstream influence of blade 10B approaching aperture 18 can be countered by a wake of blade 10A which has just passed in front of aperture 18. The plan form and profile of blades 10 are designed to cause the downwash to persist after a blade 10 has passed aperture 18 and thereby to seal the laser 14 even when there is no solid material in front of aperture 18. The variety of pressure outside aperture 18 as the air foil or blades 10 moves downstream may be adjusted to coincide with the decrease in cavity pressure between pulses. Such a subsonic operation is illustrated in FIG. 2.

Figure 4:
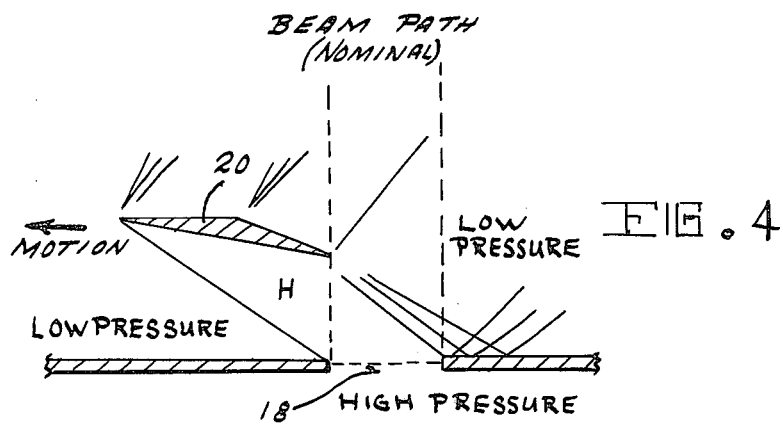
FIGS. 4–7 are schematic illustrations of a variety of positions of a blade of the aerodynamic window of this invention in a supersonic operation.
Figure 5:
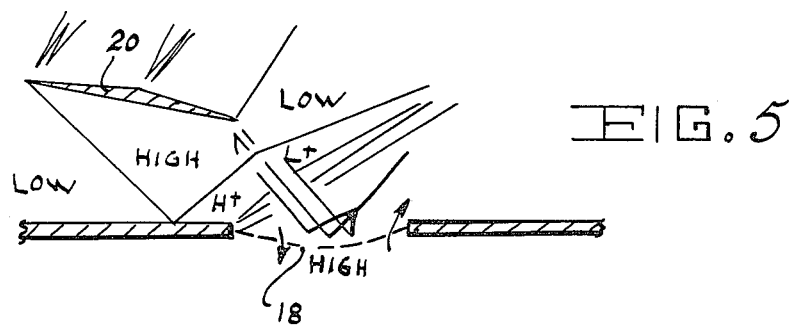
Figure 6:
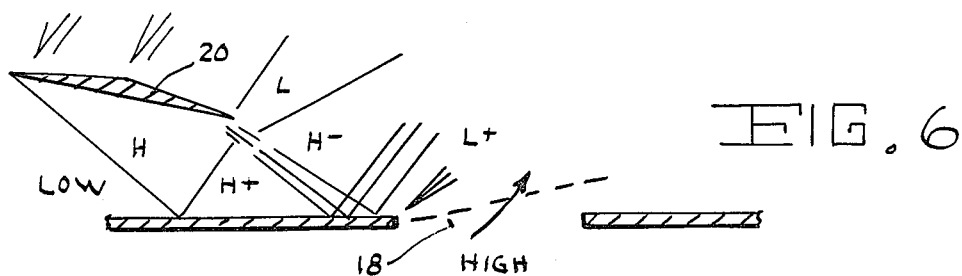
Figure 7:
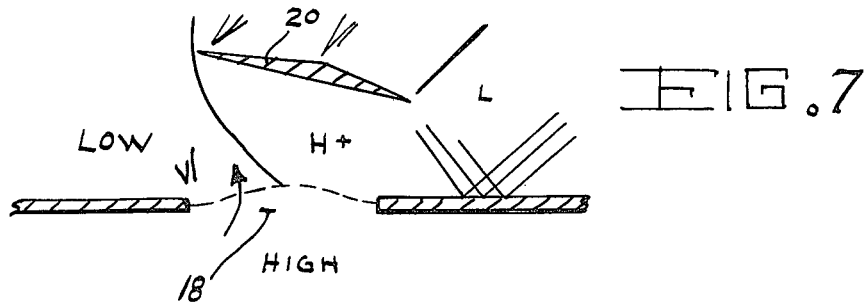

The phenomena to be expected during the supersonic operation is best illustrated in FIGS. 4–7. Only when a wave pattern emanating from a blade 20 is aligned with aperture 18 as shown in FIG. 4 will aperture 18 be ideally closed. At all other times, as shown in FIGS. 5–7, slight leakage and ingestion may occur. However, it should be pointed out that even under these conditions the operation of this invention is extremely efficient. It may be possible, if desirable, to incorporate feedback which alters blade incidence in response to any leakage detected. Beam extraction can take place either when aperture 18 is "closed" or when it is "opened" between blades 20. At very high pressure ratios, staged bladerows may be required.

Figure 3:
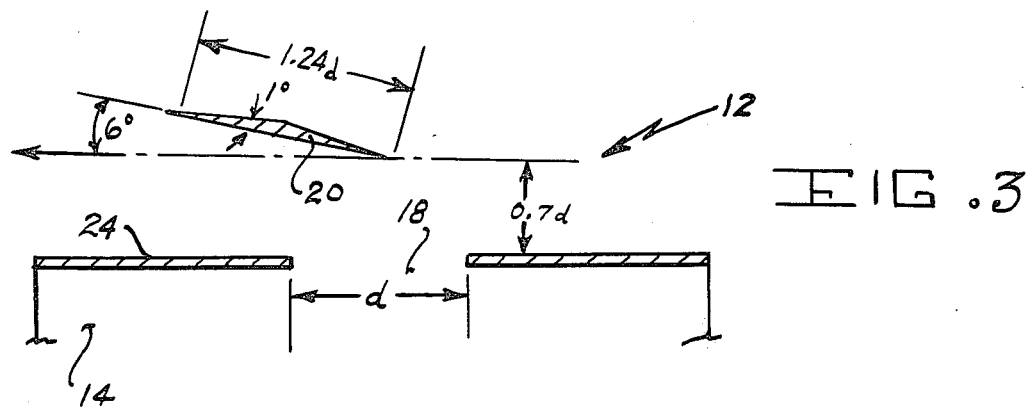
FIG. 3 is a schematic illustration of a representative design of a blade of the aerodynamic window of this invention.

FIG. 3 best illustrates the requirements for construction of a blade 20 in the aerodynamic window 12 of this invention. The perimeters set forth in FIG. 3 are representative of a supersonic system. Simple two-dimensional supersonic theory predicts that a pressure difference of approximately 0.5 the ambient pressure can be supported by a blade 20 rotating at approximately 2.5 times the ambient speed of sound with the blade 20 inclined at approximately 6° to the surface 24 of the wall of laser 26. The length of a typical blade 20 would be approximately 1.24 times the diameter, $d$, of the aperture 18 of laser 14. The angle of the blade itself would be approximately 1° with respect to the bottom surface of blade 20. In addition, it is desirable that the blade 20 be mounted so that its trailing edge is approximately 0.7 $d$. An aerodynamic window 12 of this invention built with the preceeding geometry would have a pulse rate of approximately 2,000Hz.

Although this invention has been described with reference to particular embodiments it will be understood to those skilled in the art that this invention is also capable of a variety of alternate embodiments within the spirit and scope of the appended claims.

We claim:

1. In combination with a gaseous laser having an aperture therein, a plurality of spaced blades located adjacent said aperture forming an aerodynamic window in front of said aperture and means operably connected to said blades for moving said blades in front of said aperture at a predetermined speed.

2. The combination as defined in claim 1 wherein said means for moving said blades comprises a disc and a motor operably connected to said disc, said blades being secured to said disc for movement therewith.

3. The combination as defined in claim 2 wherein said aperture is of a predetermined dimension, $d$, and the trailing edge of each of said blades is substantially 0.7 $d$ when said blade is located in front of said aperture.

4. The combination as defined in claim 3 wherein each of said blades has a length of substantially 1.24 $d$.

5. The combination as defined in claim 4 wherein the leading edge of each of said blades is substantially 6° from a line parallel to said aperture surface when said blade is located in front of said aperture.

6. The combination as defined in claim 5 wherein the leading edge of each of said blades is formed at an angle of 1° with respect to the bottom surface of said blade.

7. The combination as defined in claim 6 wherein said predetermined blade speed is substantially 2.5 times the ambient speed of sound.

\* \* \* \* \*